United States Patent [19]
Bottari et al.

[11] 3,879,410
[45] Apr. 22, 1975

[54] 4-ARYL-4-OXAZOLIN-2-ONES EXHIBITING MYOTONIC AND MYORELAXING ACTIVITY

[75] Inventors: Francesco Bottari; Marco Fabrizio Saettone, both of Pisa; Maria Francesca Serafini, Carrara; Natale Tellini, Pisa, all of Italy

[73] Assignee: Messrs. Laboratorio Guidotti & C. S.p.A., Pisa, Italy

[22] Filed: Feb. 3, 1972

[21] Appl. No.: 223,090

[30] Foreign Application Priority Data
Feb. 8, 1971 Italy.................................. 45210/71

[52] U.S. Cl.......... 260/307 C; 260/482 C; 260/592; 424/272
[51] Int. Cl............................................. C07d 85/38
[58] Field of Search .................................. 260/307 C

[56] References Cited
FOREIGN PATENTS OR APPLICATIONS
1,496,594  9/1967  France

OTHER PUBLICATIONS
Bottari et al., J. Med. Chem. 1972, 15(1), 39–40.
Huisgen et al., C.A. 63, 16337d, h(1965).
Saettone et al., C.A. 66, 94936x (1967).

Primary Examiner—Donald G. Daus
Assistant Examiner—Raymond V. Rush
Attorney, Agent, or Firm—Steinberg & Blake

[57] ABSTRACT
Therapeutically active compounds for use as agents stimulating and depressing muscular tone and central nervous system, having as formula

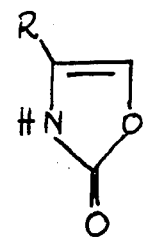

3 Claims, No Drawings

4-ARYL-4-OXAZOLIN-2-ONES EXHIBITING MYOTONIC AND MYORELAXING ACTIVITY

This invention relates to a series of 4-aryl-4-oxazolin-2-ones and to methods for preparing the same.

The compounds according to the invention have been found to be useful therapeutic agents, after some of such compounds exhibit a marked stimulating activity on the central nervous system and muscular tone, while other compounds exhibit a sedative and myorelaxing effect. The compounds according to the invention are shown by the following general formula:

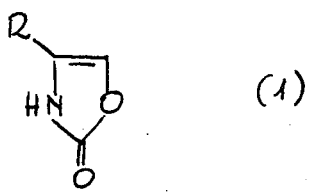

wherein R may be anyone of the following groups:

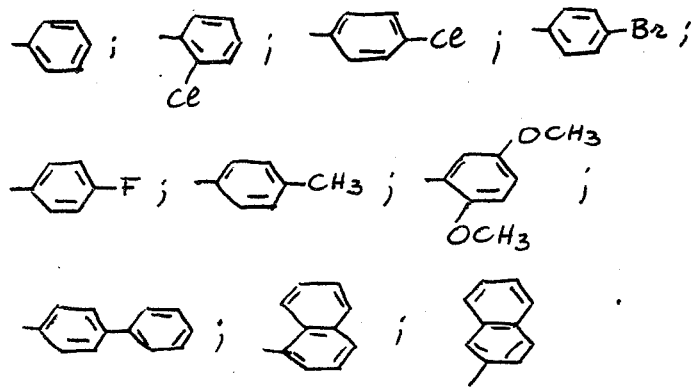

As shown in Scheme I, the 4-aryl-4-oxazolin-2-ones (1) according to the present invention can be produced by cycling, under various conditions, the corresponding 2-aryl-2-oxoethyl-carbamates (3). In turn, these carbamates can be produced by treating 2-aryl-2-oxoethanols (2) with phosgene and ammonia (Method a), or alternatively with sodium isocyanate and trifluoroacetic acid (Method b).

SCHEME I

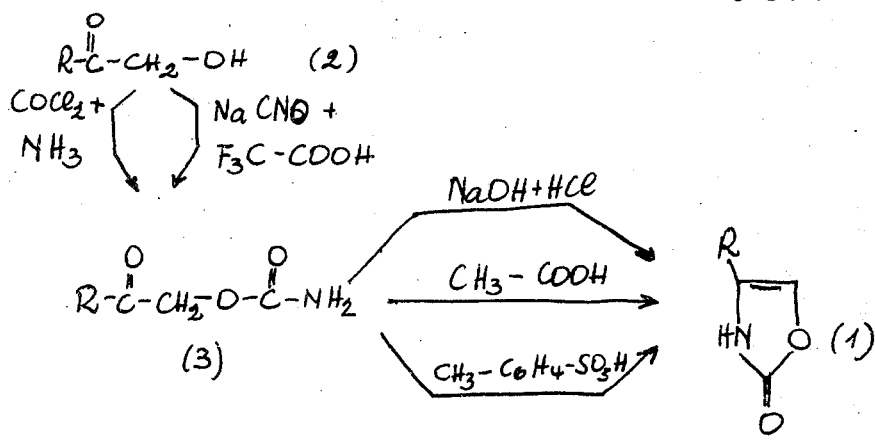

As shown in Scheme I, the conversion of the several carbamates into the corresponding 4-oxazolin-2-ones-4-substituted can be accomplished by simple cold dissolution in 10% aqueous NaOH and subsequent acidification (Method a), or by prolonged ebullition of carbamate in acetic acid (Method b), or with p-toluenesulphonic acid (Method c).

The myorelaxing and myotonic activity of the products according to the invention has been discovered and studied by tests "in vitro" and "in vivo": in the tests "in vitro" by measuring the contracturing, or antagonistic action thereof to the contractions induced by barium-chloride, on a length of guinea pig ileus maintained in a suitably predetermined bath (test on Magnus isolated organ), as compared with barium-chloride and papaverine. In the tests "in vivo," in addition to appreciating the changes in the general body tone, the myotonic or myorelaxing activity thereof has been quantitatively estimated, as compared with physostigmine (known natural myotonically active drug) and mephenesine (3-(o-tolyloxy)-1,2-propanediole:(known myorelaxingly active drug), by experimentally measuring the animal prehension force versus the time of resistance exhibited by them in supporting a metal bar weighing 20 grams.

The activity on the central nervous system has been studied through the autocinesis test and extimating the strengthening or the antagonism in the hypnosis as provided by barbiturates.

The results of these tests have demonstrated that 4-naphtyl- and 4-diphenylyl-4-oxazolin-2-ones have a mildly sedative and myorelaxing type of action which is more marked than reference drugs, while the other 4-aryl-4-oxazolin-2-ones exhibit a myotonic type of action on smooth and striated muscular system attaining at a dose of 0.05 mg/kg a maximum effect which in reference drugs appears at substantially higher doses, such as 0.3 mg/kg physostigmine and 1 mg/kg cardiazole (pentetrazole (D.C.I.) : 6,7,8,9-tetrahydro-5H-tetrazolazepine) and 7.0 mg/kg guanidine, and a stimulating activity on the central nervous system. Due to such pharmacological properties and in view of the low toxicity thereof, some of the compounds according to the invention are advantageous as therapeutic agents suitable in therapy of myoastenias of varying nature and as antifatigue agents, while the 4-naphtyl- and 4-diphenylyl-4-oxazolin-2-ones are suitable as myorelaxing, antispastic and sedative drugs.

By way of example the preparation will now be given for some of the compounds according to the present invention.

EXAMPLE 1

2-phenyl-2-oxo-ethyl carbamate (Formula 3,

R =  )

Method a 10 g 2-phenyl-2-oxo-ethanol were dissolved in a mixture comprising 100 ml anydrous benzene and 20 ml freshly distilled dimethylaniline and slowly added with 40 ml 20% solution of phosgene in toluol, cooling at 0°C and stirring. Upon addition completion, the mixture was stirred at room temperature for 15 minutes, then cooled again at 0°C and a stream of gaseous ammonia was caused to pass through the mixture to saturation. The solid being obtained was washed with water after collection and crystalized from benzene. 7.55 g crystals m.p. 149°–152°C were obtained.

Method b 2 g 2-phenyl-2-oxo-ethanol and 1.4 g sodium cyanate were dissolved in 20 ml anydrous benzene and then dropwise added with 2.1 ml trifluoroacetic acid. The reaction mixture was stirred for about 3 hours at room temperature. The mixture was then diluted with water, separating the organic layer and drying on MgSO$_4$. The solvent was evaporated at a reduced pressure at 40°–50°C. The solidified residue was collected, washed with petroleum ether and crystalized from benzene. 1.950 g product m.p. 149°–152°C was obtained.

EXAMPLE 2

4-phenyl-4-oxazolin-2-one (formula 1,

R =  )

Method A 2 g 2-phenyl-2-oxo-ethyl carbamate were dissolved in 15 ml 10% NaOH solution at room temperature. Upon cautious acidification of the solution, the product was separated, collected, washed with water and crystalized from benzene. 1.7 g crystals m.p. 151°–153°C was obtained.

Method B 5 g 2-phenyl-2-oxo-ethyl carbamate were refluxed for 5 hours in 30 ml glacial acetic acid. After cooling, the reaction mixture was poured in a solution of Na$_2$CO$_3$ and ice. The formed precipitate was collected and crystalized from benzene. 4.2 g crystals m.p. 151°–153°C was obtained.

Method C 5 g 2-phenyl-2-oxo-ethyl carbamate and 100 mg p-toluensulphonic acid were refluxed for 5 hours in 50 ml toluene, using a reaction vessel permitting removal from the reactant mixture water formed during the reaction. Solvent was then evaporated at reduced pressure; the formed precipitate was collected and crystalized from benzene. 4 g product m.p. 151°–153°C were obtained.

By the general methods as described in the above Examples 1 and 2, the 2-aryl-2-oxo-ethyl carbamates and 4-aryl-4-oxoazolin-2-ones, respectively, according to the present invention were prepared, the following being a list for the features thereof:

1. - 2-phenyl-2-oxo-ethyl carbamate (Formula 3, R = 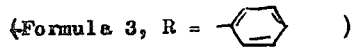 )

Colourless crystals purified from benzene, m.p. 149°–152°C.

2. - 2-(4'-bromophenyl)-2-oxo-ethyl carbamate (Formula 3, R =  )

Colourless crystals purified from ethanol, m.p. 195°–198°C.

3. - 2-(4'-chlorophenyl)-2-oxo-ethyl carbamate (Formula 3, R =  )

Colourless crystals purified from ethanol, m.p. 196°–200°C.

4. - 2-(4'-fluorophenyl)-2-oxo-ethyl carbamate (Formula 3, R =  )

Colourless crystals purified from benzene, m.p. 166°–168°C.

5. - 2-(4'-methylphenyl)-2-oxo-ethyl carbamate (Formula 3, R = 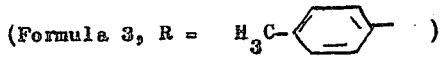 )

Colourless crystals purified from ethanol, m.p. 183°–185°C.

6. - 2-(2',5'-dimethoxyphenyl)-2-oxo-ethyl carbamate (Formula 3, R = 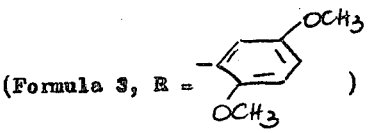 )

Colourless crystals purified from benzene, m.p. 140°–142°C.

7. - 2-(diphenyl)-2-oxo-ethyl carbamate (Formula 3, R =  )

In the preparation reaction for this compound, 1,2-dimethoxyethane was used as a solvent.

Colourless crystals purified from ethyl acetate, m.p. 190°–205°C with sublimation.

8. - 2-(1'-naphtyl)-2-oxo-ethyl carbamate (Formula 3, R = 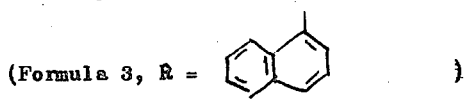 )

Colourless crystals purified from benzene, m.p. 180°–183°C.

9. - 2-(2'-naphtyl)-2-oxo-ethyl carbamate (Formula 3, R = 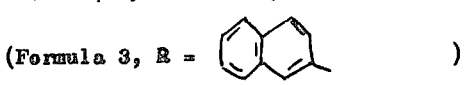 )

Colourless crystals purified from benzene, m.p. 165°–167°C.

10. - 4-phenyl-4-oxazolin-2-one (Formula 1, R = 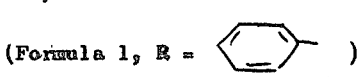 )

Colourless crystals purified from benzene, m.p. 151°–153°C.

11. - 4-(4'-bromophenyl)-4-oxazolin-2-one (Formula 1, R = 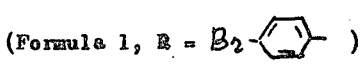 )

Colourless crystals purified from acetone, m.p. 248°–250°C.

12. - 4-(4'-chlorophenyl)-4-oxazolin-2-one (Formula 1, R = 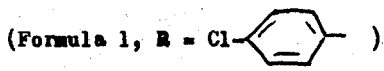 )

Colourless crystals purified from ethanol, m.p. 260°–263°C.

13. - 4-(2'-chlorophenyl)-4-oxazolin-2-one (Formula 1, R =  )

Colourless crystals purified from ethanol, m.p. 207°–209°C.

14. - 4-(4'-fluorophenyl)-4-oxazolin-2-one (Formula 1, R = 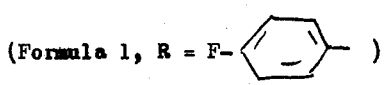 )

Colourless crystals purified from benzene, m.p. 210°–212°C.

15. - 4-(4'-methylphenyl)-4-oxazolin-2-one (Formula 1, R = 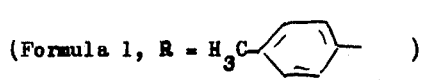 )

Colourless crystals purified from ethyl acetate, m.p. 196°–200°C

16. - 4-(2',5'-dimethoxyphenyl)-4-oxazolin-2-one (Formula 1, R =  )

Colourless crystals purified from ethanol, m.p. 218°–220°C.

17. - 4-diphenylyl-4-oxazolin-2-one (Formula 1, R = 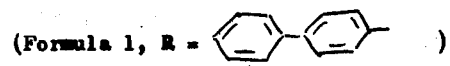 )

Colourless crystals purified from ethanol, m.p. 219°–224°C.

18. - 4-(1'-naphtyl)-4-oxazolin-2-one (Formula 1, R = 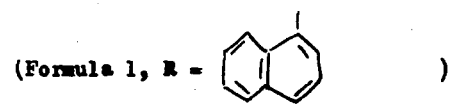 )

Colourless crystals purified from ethanol, m.p. 180°–183°C.

19. - 4-(2'-naphtyl)-4-oxazolin-2-one (Formula 1, R = 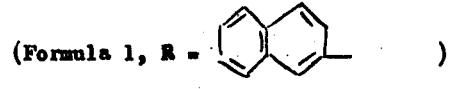 )

Colourless crystals purified from benzene, m.p. 202°–204°C.

What we claim is:

1. A compound of the formula:

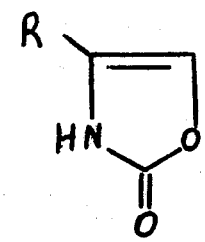

wherein R is selected from the group consisting of:

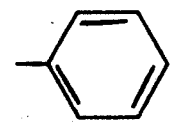

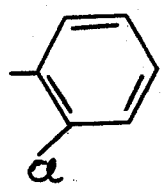 , 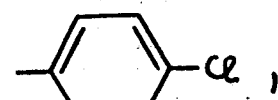 , 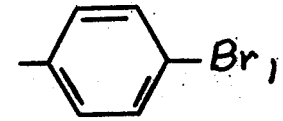 ,

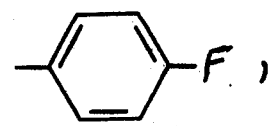 , 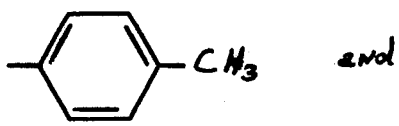 and

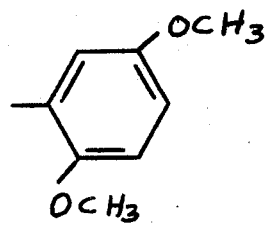

2. Compound according to claim 1 wherein R is:
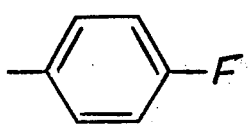
3. Compound according to claim 1 wherein R is:
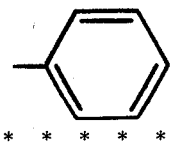
\* \* \* \* \*